Jan. 22, 1963  J. L. MOSSEY ETAL  3,074,514
AUTOMATIC ADJUSTER
Filed March 20, 1961  4 Sheets-Sheet 1
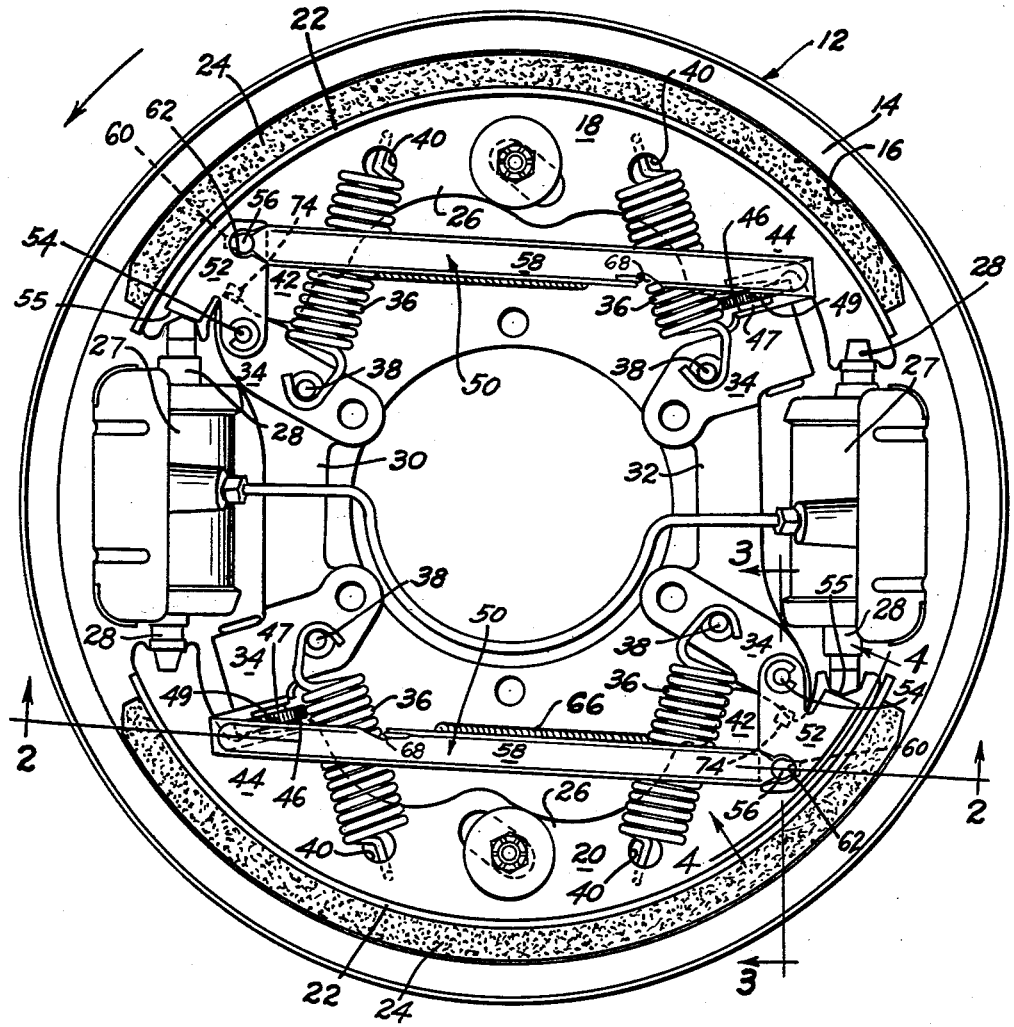
FIG_1
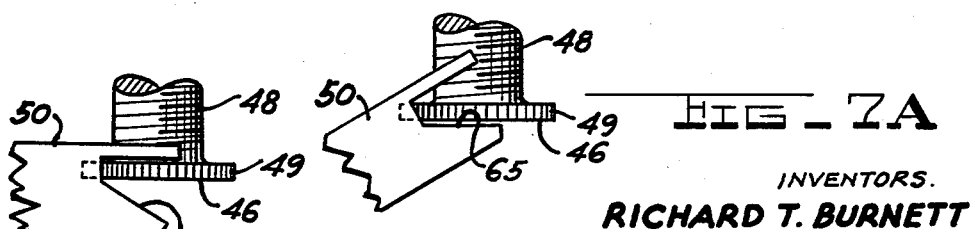
FIG_6A  FIG_7A
INVENTORS.
RICHARD T. BURNETT.
JOSEPH L. MOSSEY.
BY
John A. Young
ATTORNEY.

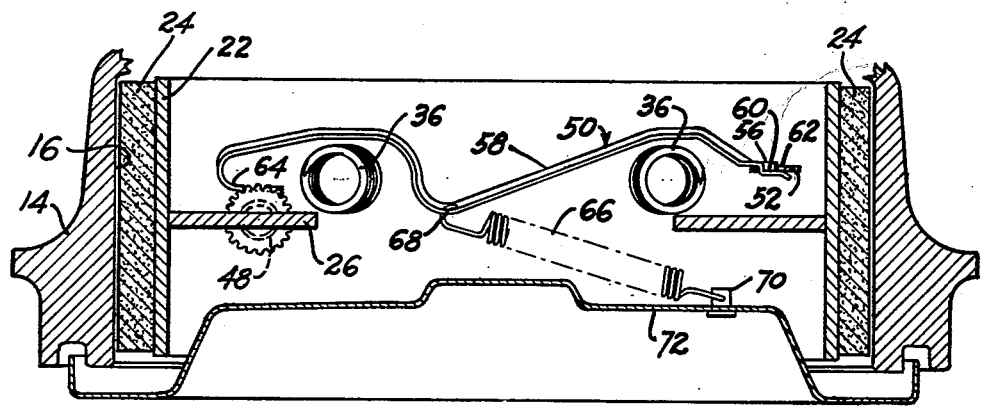

Jan. 22, 1963
J. L. MOSSEY ETAL
3,074,514
AUTOMATIC ADJUSTER
Filed March 20, 1961
4 Sheets-Sheet 3
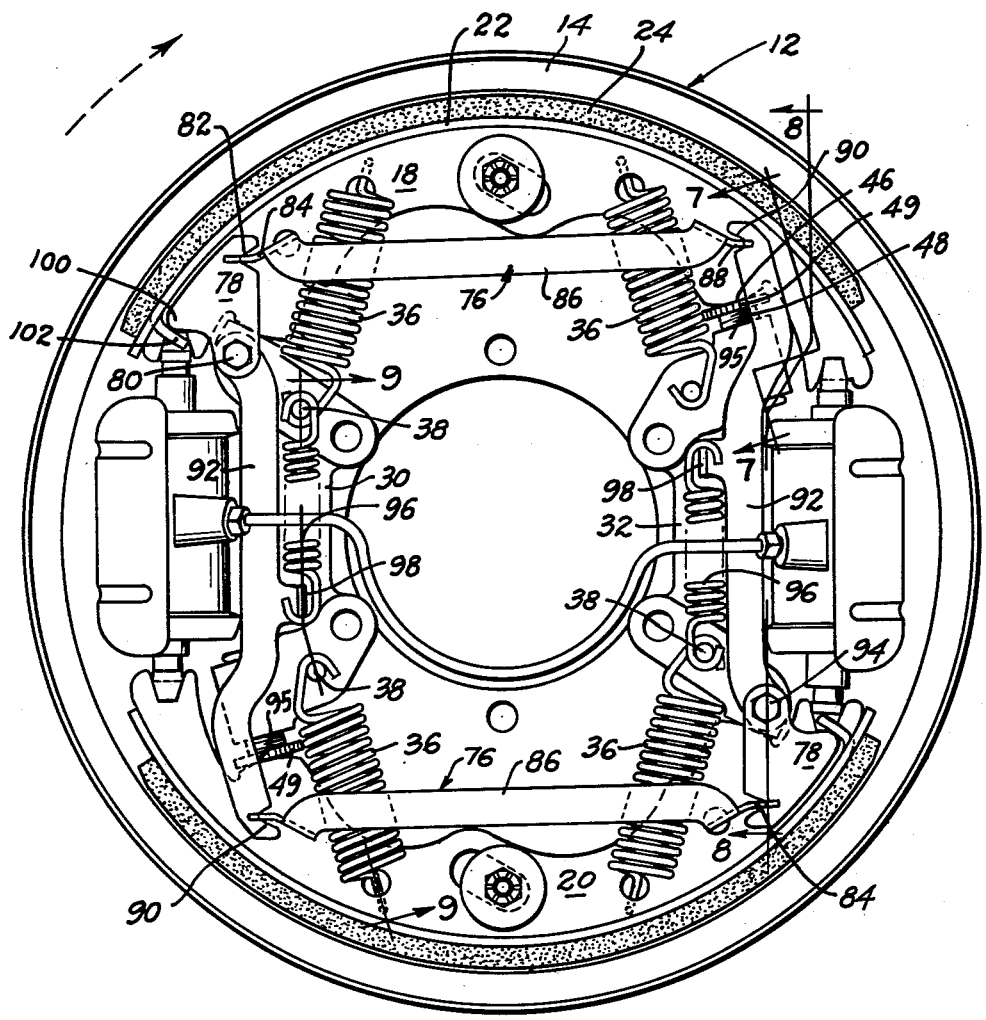
FIG_6
INVENTORS.
RICHARD T. BURNETT.
JOSEPH L. MOSSEY.
BY
John A. Young
ATTORNEY.

Jan. 22, 1963   J. L. MOSSEY ETAL   3,074,514
AUTOMATIC ADJUSTER
Filed March 20, 1961   4 Sheets-Sheet 4
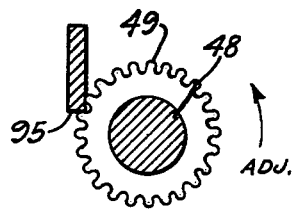
FIG_10
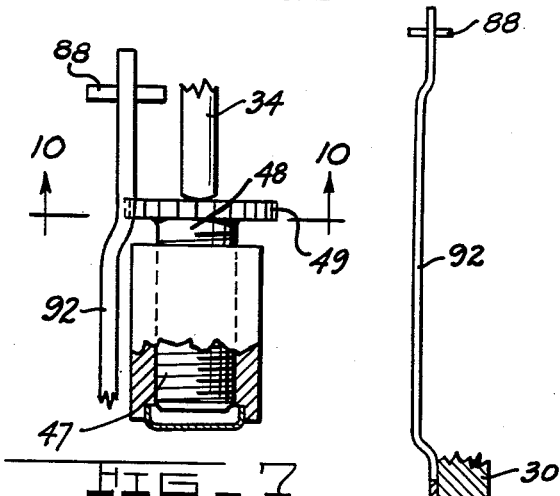
FIG_7
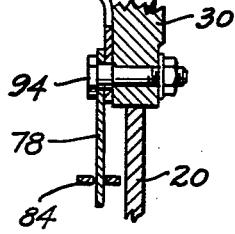
FIG_8
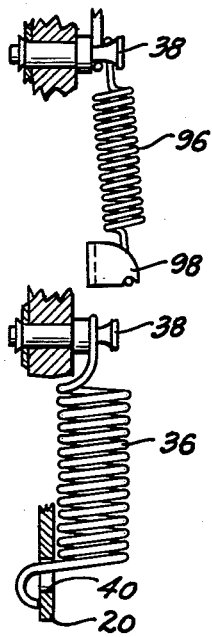
FIG_9
INVENTORS.
**RICHARD T. BURNETT.
JOSEPH L. MOSSEY.**
BY
*John A. Young*
ATTORNEY.

United States Patent Office 3,074,514
Patented Jan. 22, 1963

3,074,514
AUTOMATIC ADJUSTER
Joseph L. Mossey and Richard T. Burnett, South Bend, Ind., assignors to The Bendix Corporation, South Bend, Ind., a corporation of Delaware
Filed Mar. 20, 1961, Ser. No. 96,788
6 Claims. (Cl. 188—79.5)

This invention relates to an automatic adjuster for brakes and more particularly to automatic adjusters which are used with brake configurations of the "two leading shoe" type.

The requisites for an automatic adjuster are that the structure be inexpensive to produce and easy to install in the brake assembly; and from a functional standpoint, the adjuster must be precise in operation, not subject to making overadjustments of the brake and yet sufficiently sensitive to brake wear to provide adjustments which maintain the appropriate running clearance between the brake shoes and the opposing engageable surface of the rotatable drum. These requisites are considerably more difficult to meet than might appear since, in spite of the many thousands of proposals on this subject, only a relatively few adjusters have ever been accepted for commercial use.

Accordingly, it is one of the objects of the present invention to provide an automatic adjuster for brakes of the "two leading shoe" type in which the adjuster consists of a reduced number of parts each of which is inexpensive to manufacture, and the adjuster assembly can be readily installed in the brake for continuous operation in maintaining proper adjustment of the brake shoes until the brake shoes require replacement.

Another object of the invention is to provide an automatic adjuster which will maintain a proper running clearance in the brake regardless of extent of wear of the lining of the brake shoes so that the same pedal travel is maintained regardless of the condition of wear of the lining. At the same time, it is intended that the adjuster operation will effect such adjustment in the absence of over adjustment or dragging condition of the brake wherein the lining is in engagement with the opposing drum surface even when the brakes are released.

Another object of the invention is to relate the adjusting function of the adjusters to the amount of travel required by the piston in the wheel cylinder actuator so that the pedal travel remains substantially constant i.e., since the main objection to wear of the brake is its effect of increasing displacement requirements, then automatic adjuster functioning relating directly to pedal travel accomplishes most efficiently the object of fixing the pedal travel to a given range and to a given amount.

Other objects and features of the present invention will become more apparent from a consideration of the following description which proceeds with reference to the accompanying drawings, wherein a plurality of embodiments of the invention are illustrated by way of example.

In the drawings:

FIGURE 1 is a side elevation view of a brake having automatic adjusters of the present invention installed thereon;

FIGURES 2 and 3 are sectional views taken on lines 2—2 and 3—3 respectively in FIGURE 1;

FIGURE 4 is a view of the lever and the actuator looking in the direction of the arrows 4—4 in FIGURE 1 with the brake drum removed and the brake shoe shown in fragmentary section;

FIGURE 5 is an isometric detail view of the automatic adjuster lever;

FIGURES 6A and 7A are enlarged details of the adjuster tooth and wheel in different positions wherein the brake shoes are retracted and are being applied;

FIGURE 6 is a side elevation view of a brake the same as the brake shown in FIGURE 1 but having a different automatic adjuster installed thereon, forming a second embodiment of the invention;

FIGURES 7, 8 and 9 are sectional views taken respectively on the line 7—7, 8—8 and 9—9 in FIGURE 6; and, FIGURE 10 is a section view taken on line 10—10 in FIGURE 7.

Referring now to the embodiment shown in FIGURES 1–5 there is illustrated a brake 12 comprising a rotatable drum 14 having a cylindrical braking surface 16 engageable by two brake shoes 18 and 20, each shoe being of T-shape cross section and including an arcuate rim 22 having friction material lining 24 and a strengthening web 26.

The brake shoes are actuated by wheel cylinders 27 disposed between the ends of the shoes, each wheel cylinder having a pair of oppositely facing pistons acting through links 28 connected to the shoes and thereby moving the shoes radially outwardly and engaging lining 24 with cylindrical surface 16. The brake is known as a two leading shoe brake, meaning, that for each direction of drum rotation the leading end of each shoe is the applied end and its opposite end is the anchored end; each shoe is therefore an energizing brake shoe in both directions of drum rotation. Thus, assuming braking with the drum rotating in the direction indicated by the arrow indicated in FIGURE 1, the right hand end of brake shoe 18 is the applied end and the left hand end is the anchored end, and for brake shoe 20 the left hand end is the applied end and the right hand end of brake shoe 20 is the anchored end. Details of the construction and operation of the brake may be found in U.S. Patent No. 2,822,065 issued February 4, 1958, entitled "Brake Assembly."

The anchoring load of the brake shoe is sustained by two torque taking brackets 30 and 32, each bracket having extensions 34 which straddle the wheel cylinder 27 and receive the anchoring load of the shoes which are free to both pivot and slide on surfaces of the projections 34. The brake shoes are held in a normally retracted position by two pairs of retracting springs 36, each brake shoe having one pair of springs which is connected in tension between posts 38 at one end and pass through openings 40 in the webs of the shoes at their opposite ends. The one end 42 of each shoe bears directly against its projection 34 of the bracket 30 and the opposite end 44 of each brake shoe bears against head 46 of an adjusting screw 48 threadedly received within the projection 34 to adjust the shoes. The stem 47 is rotated through its serrated outer periphery 49 by means of an automatic adjuster mechanism designated generally by reference numeral 50, there being an automatic adjuster for each brake shoe constructed identically and functioning simultaneously to maintain the proper adjusted positions for both shoes.

Each automatic adjuster assembly 50 comprises an adjuster lever 52 which is mounted for pivotal movement on pin 54 received in projection 34 of bracket 30 and bracket 32 respectively, and includes an abutment surface 55 engaged by link 28 of the wheel cylinder actuator. The lever 52 has an articulated connection 56 with strut 58, the articulated connection 56 being provided by simply extending a portion 60 of the strut 58 (FIGURE 2) through an opening 62 of lever 52 wherein the strut 58 is journalled for pivotal movement. The strut 58 has a downwardly bent portion 64 having a notch 65 (FIGURES 6A and 7A) which engages the serrated outer periphery 49 to form a driving connection therewith, whereby reciprocable movement of the strut 58 causes rotation of the stem 49, advancing head 46 and thereby adjusting the brake shoe end in engagement therewith. The strut is biased in one direction by means of a spring 66 which is fastened in tension between strut 58 at 68 and anchor 70 which is secured to the backing plate 72.

In operation, assuming reverse rotation of the brake drum (adjuster operation can occur only during reverse vehicle movement) with the drum rotating clockwise in FIGURE 1, when the wheel cylinders 27 are energized by communicating fluid pressure from some appropriate source, the link 28 of the left hand wheel cylinder forces end 42 of brake shoe 18 outwardly and the right hand end of shoe 18 anchors on bracket 32 through the head 46 of adjuster screw 48. Simultaneously, the right hand end of shoe 20 becomes the applied end and it anchors at its left hand end on the head of adjuster screw held by the other anchoring bracket 30. If the brake shoes are in need of adjustment because of excessive running clearance between lining 24 and surface 16 of the drum, this will cause the links 28 of the wheel cylinder actuators to travel sufficiently to produce an adjustment. This adjustment is effected by engagement of link 28 with lever 52 (FIGURE 4). Movement of the link 28 at the applied end 42 of shoe 18 produces clockwise rotation of lever 52 forcing strut 58 toward the right against the resistance of spring 66 and should movement of the lever 52 be sufficient to obtain an adjustment, the notch 65 will engage a successive serration on the periphery 49 of head 46 so that when the brake is released spring 66 will bias strut 58 in a reverse direction causing rotation of stem 48 and advancing head 46 to bring the retracted position of the shoe outwardly toward the drum and thereby maintaining the same running clearance between the lining 24 and surface 16 of the drum. The spring 66, as it biases the strut 58 in a reverse direction, produces counterclockwise rotation of lever 52 at shoe end 42 of the shoe 18 until stop 74 engages extension 34 of anchor bracket 30. For all brake applications in reverse vehicle movement, wherein running clearance is not excessive, movement of the link 28 will be insufficient to rotate lever 52 to a point wherein the notch 65 of the strut 50 engages successive serrations, so the shoe maintains its original clearance.

The shoe 20 is adjusted in the same manner as described for shoe 18 so that simultaneously with adjusting operation for shoe 18, the shoe adjustment 20 is likewise adjusted so that pedal travel requirements remain the same regardless of the extent of wear of lining 24 on either shoe. It should now be apparent that the pedal travel requirements remain the same throughout the useful life of the brake shoes and no servicing is required of the brake until the lining is completely worn at which time the shoes are replaced.

Referring next to the embodiment shown in FIGURES 6-10 the brake structure is the same as in the previous embodiment so that description of the brake will be omitted and the parts identified by the same reference numerals. The adjuster assembly designated generally by reference numeral 76 maintains the adjusted position for the brake shoes 18 and 20 regardless of the extent of erosion of the wearable lining 24. The adjuster assembly comprises a lever 78 which is journalled on a pivot pin 80 secured to the anchor bracket 30 and notched at 82 to receive a flange 84 of strut 86 having a second flange 88 at its opposite end received within notch 90 of lever 92. The lever 92 is journalled on pivot pin 94 which is the same construction as pivot pin 80. It will be noted that each pivot pin 80, 94 serves to mount one of the levers 92 and one of the levers 78.

Each lever 92 has a tooth edge 95 forming a driving connection with the serrated periphery 49 of head 46 formed integrally with adjuster bolt 48. Each lever 92 is biased for turning movement about its pivot bolt 80, 94 by a spring 96 which is stretched in tension between post 36 and a tab 98 of the lever 92, the spring force being offset from the center of pivotal movement of the lever to create a turning force on the lever 92. The limit of turning movement of the lever 92 by the spring 96 is determined by engagement of lever 78 at its end 100 with a turned back integral flange portion 102 of the shoe rim 22.

In operation, adjuster operation is effective during braking with reverse vehicle movement corresponding to clockwise rotation of the drum 14 in FIGURE 6 as indicated by the arrow. During braking with reverse vehicle movement, the left hand of shoe 18 is the applied end and as the shoe 18 is pivoted outwardly about its right hand end, should there be excessive wear of the lining, this will result in excessive shoe movement. In this embodiment, shoe movement, by virtue of engagement between flange 102 of the shoe and portion 100 of lever 78, will produce a proportional amount of pivoting of lever 78 which pivotal movement of lever 78 imparts rightward movement of the upper strut 86 in FIGURE 6 which in turn pivots lever 92 clockwise about pivot pin 94 against the resistance of spring 96 and in those instances where shoe movement is sufficient because of excessive lining wear, the tooth edge 95 of lever 92 engages a successive serration on periphery 49 so that when the brake is released, the spring 96 rotates lever 92 in a counterclockwise direction about 94 thereby rotating the adjuster screw 48 so that the head advances toward the drum and locates shoe 18 radially outwardly to a new retracted position so that the running clearance between the lining 24 and opposing drum surfaces is reestablished to a proper amount. Since adjuster operation for both shoes accompanies each reverse application, which occurs with sufficient frequency, the brake is kept in constant adjustment and does not require servicing until the lining 24 is completely used whereupon the shoes are replaced.

There is an identically constructed adjuster 76 at the lower part of FIGURE 6 which functions in cooperation with shoe 20 and operates simultaneously to adjust shoe 20 so that both brake shoes are maintained in proper adjustment. It will be further seen that the two levers 92 and the two levers 78 are jointly mounted so that only two pivot bolts 80, 94 are required; the levers 78, strut 86 and levers 92 are identically constructed so that they are reversible from one side to the other. This standardization of parts also makes it possible to effect a savings in manufacture.

Although only two embodiments of the invention have been selected for illustration, it will be understood that the invention is in on way restricted to these two embodiments. It is reasonably to be presumed that those skilled in the art can make numerous modifications and revisions of the invention as suit individual design requirements. And it is intended that such revisions and variations as incorporate the herein disclosed principles, will be included within the scope of the following claims, as equivalents of the invention.

What is claimed is:

1. In a brake, an automatic adjuster for a pair of brake shoes having adjacent ends with both anchoring and actuating means therebetween, two threaded members having serrated wheels defining the retracted and anchoring position of one end of each of said shoes in one direction of braking and rotatably mounted in said anchoring means, two bellcranks mounted for rotation on a stationary part of said brake one at each of the ends of said shoes opposite from said threaded members, means forming an operative connection between each of said bellcranks and said actuating means to effect bellcrank rotation concurrently with shoe movement resulting from braking in said one direction to effect rotation thereof, two struts, one pivotally connected to each of the output ends of said bellcranks and extending chordally of the brake shoes and terminating in means having a driving connection which engages the serrated wheels at the opposite ends of the brakes effecting turning movement of said wheels concurrently with shoe movement resulting from braking in said one direction, each of said struts and their respective bellcranks being rotatable relative to each other, and two springs one stretched between each of said struts and a fixed part of the brake structure to effect longitudinal returning force on said strut and also effecting lateral biasing effort on said strut to engage said last mentioned means with successive serrations, each of said actuating means producing turning movement of said bellcranks against the resistance of said springs during brake application in said one direction.

2. In a brake, an automatic adjuster for brakes including two brake shoes arranged in end-to-end relation and having both anchoring and actuating means between each adjacent pair of shoe ends to provide anchoring and applying force for one end of each shoe in both forward and reverse directions of braking, threaded means rotatably mounted in each of said anchoring means and having an abutment defining the retracted position of one end of each shoe engageable therewith, two bellcranks one mounted for pivotal movement on a stationary part of said brake at the ends of each shoe opposite their ends in engagement with said threaded means, means forming an operative connection between each of said bellcranks and said actuating means to effect bellcrank rotation concurrently with shoe movement resulting from braking in one of said directions, a strut extending between the ends of each of said shoes and each having a pivotal connection with one of said bellcranks at one end and a flange at the other end, each of said struts and their respective bellcranks being rotatable relative to each other, a pawl-and-ratchet connection between each flange and abutment to effect rotation of said threaded means concurrently with shoe movement resulting from braking in said one direction and consequent outward movement thereof to adjust the shoe ends outwardly, and resilient spring means stretched between each strut and a fixed part of the brake and opposing bellcrank movement by said actuating means, each of said springs having a lateral component for maintaining said pawl-and-ratchet connection.

3. A brake comprising a backing plate, two spaced anchoring means located at opposite sides of the brake, two brake shoes mounted in end-to-end relation and each having their opposite ends pivotally associated with said anchoring means, actuating means between each pair of adjacent shoe ends to effect spreading thereof and thereby obtain leading shoe braking in each direction of vehicle movement, threaded means received in each of said anchoring means and including an abutment defining the retracted position of one end of each shoe in engagement therewith, a strut extending between the ends of each of said shoes, a bellcrank mounted for rotation on a stationary part of said brake and disposed at the shoe end oppositely to its end in engagement with said abutment, a thrust connection between each actuating means and bellcrank to effect rotation of the bellcrank responsively to actuation of the brake in one direction of vehicle movement, means forming a pivotal connection between each bellcrank and a respective one of said struts to displace said struts longitudinally, each of said struts and their respective bellcranks being rotatable relative to each other, a spring fastened in tension between each strut and backing plate and urging said strut downwardly to effect a driving connection between said strut and said threaded means and to urge said strut in a direction effecting turning of said threaded means to advance said abutment and adjust the shoe end in contact therewith, said strut being displaceable by bellcrank movement against the resistance of said spring during brake application in said one direction and thereafter returned by said spring to effect an adjustment.

4. In a brake, an automatic adjuster for a pair of brake shoes having adjacent ends with both anchoring and actuator means therebetween, two threaded members having serrated wheels defining the retracted and anchoring position of one end of each of said shoes in one direction of braking and rotatably mounted in said anchoring means, two bellcranks mounted for rotation on a stationary part of said brake one at each of the ends of said shoes opposite from said threaded members, means forming an operative connection between each of said bellcranks and said actuating means to effect bellcrank rotation concurrently with shoe movement in said one direction to effect rotation thereof, two struts, one pivotally connected to each of the output ends of said bellcranks and extending chordally of the brake shoes and terminating in depending flanges having notches fitting over said serrated wheels at the opposite ends of the brakes, and two springs, each of said struts and their respective bellcranks being rotatable relative to each other, one stretched between each of said struts and a fixed part of the brake structure to effect longitudinal force on said strut and resultant turning movement of said wheel and also effecting lateral biasing effort on said strut to engage the notch with successive serrations and providing a driving connection therewith, each of said actuator means producing turning movement of said bellcranks against the resistance of said springs by shoe movement during brake application in said one direction and said springs being thereafter returned to their original positions and turning said wheels thereby to advance said threaded members for adjustment of the shoes.

5. In a brake, an automatic adjuster for brakes including two brake shoes arranged in end-to-end relation and having both anchoring and actuating means between each adjacent pair of shoe ends to provide anchoring and applying force for one end of each shoe in both forward and reverse directions of braking, threaded means rotatably mounted in each of said anchoring means and having an abutment defining the retracted position of one end of each shoe engageable therewith, two bellcranks mounted for pivotal movement on a stationary part of said brake at the ends of each shoe opposite their ends in engagement with said threaded means, means forming an operative connection between each of said bellcranks and said actuating means to effect bellcrank rotation concurrently with shoe movement resulting from braking in one of said directions, a first strut extending chordally between the ends of each of said shoes and each having a pivotal connection with a respective one of said bellcranks at one end, a pair of second struts extending transversely of each first strut, each of said second struts having a pivotal connection at one end with a stationary part of said brake and pivotally connected at its other end to the other end of a respective one of said first struts, a pawl-and-ratchet connection between each of said second struts intermediate the ends thereof and a respective one of said abutments to effect rotation of said threaded means concurrently with shoe movement resulting from braking in said one direction and consequent outward movement thereof to adjust the shoe ends outwardly, resilient spring means operatively connected to said first and second struts opposing bellcrank movement by said actuating means, said spring means having a lateral component for maintaining said pawl-and-ratchet connections.

6. In a brake, an automatic adjuster for brakes including two brake shoes arranged in end-to-end relation and having both anchoring and actuating means between each adjacent pair of shoe ends to provide anchoring and applying force for one end of each shoe in both forward and reverse directions of braking, threaded means rotatably mounted in each of said anchoring means and having an abutment defining the retracted position of one end of each shoe engageable therewith, two bellcranks mounted for pivotal movement on a stationary part of said brake at the ends of each shoe opposite their ends in engagement with said threaded means, means forming an operative connection between each of said bellcranks and said actuating means to effect bellcrank rotation concurrently with shoe movement during braking in one of said directions, a first strut extending chordally between the ends of each of said shoes and each having a pivotal connection with a respective one of said bellcranks at one end, a pair of second struts extending transversely of each first strut, each of said second struts having a pivotal connection at one end with a stationary part of said brake, each of said first struts having a thrust connection at its other end with the other end of a respective one of said second struts, a pawl-and-ratchet connection between each of said second struts intermediate the ends thereof and a respective one of said abutments to effect rotation of said threaded means and consequent outward movement thereof to adjust the shoe ends outwardly, resilient spring means operatively connected to said first and second struts opposing bellcrank movement by said actuating means, said spring means having a lateral component for maintaining said pawl-and-ratchet connections and having a sufficient spring rate for turning said threaded means through said pawl-and-ratchet connections as the brake is released to accomplish brake adjustment.

References Cited in the file of this patent
UNITED STATES PATENTS

| | | |
|---|---|---|
| 1,875,065 | Lyman | Aug. 30, 1932 |
| 2,087,383 | Lafitte | July 20, 1937 |
| 2,130,857 | Press | Sept. 20, 1938 |
| 2,301,272 | Goepfrich | Nov. 10, 1942 |
| 2,822,065 | Goepfrich et al. | Feb. 4, 1958 |
| 2,994,411 | Peras | Aug. 1, 1961 |

UNITED STATES PATENT OFFICE
CERTIFICATE OF CORRECTION

Patent No. 3,074,514                          January 22, 1963

Joseph L. Mossey, et al.

It is hereby certified that error appears in the above numbered patent requiring correction and that the said Letters Patent should read as corrected below.

Column 4, line 48, for "on" read -- no --; column 6, lines 13 and 14, strike out "each of said struts and their respective bellcranks being rotatable relative to each other," and insert the same after "brakes," in line 12, same column 6.

Signed and sealed this 24th day of September 1963.

(SEAL)
Attest:

ERNEST W. SWIDER                            DAVID L. LADD
Attesting Officer                              Commissioner of Patents